United States Patent
Raab et al.

[11] Patent Number: 6,047,321
[45] Date of Patent: *Apr. 4, 2000

[54] METHOD AND APPARATUS FOR MONITORING A DEDICATED COMMUNICATIONS MEDIUM IN A SWITCHED DATA NETWORK

[75] Inventors: Ilan Raab, Sunnyvale; Robert W. Smith, Los Altos; David B. Stevens, Saratoga; Sri Reddy, Santa Clara, all of Calif.

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/714,930
[22] Filed: Sep. 27, 1996

Related U.S. Application Data
[60] Provisional application No. 60/012,038, Feb. 23, 1996.

[51] Int. Cl.[7] .............. G06F 13/38; G06F 15/17
[52] U.S. Cl. .............. 709/224; 709/239; 714/41
[58] Field of Search .............. 395/200.54, 183.15, 395/183.19, 200.69; 370/245, 247, 251, 253, 241, 452, 217; 702/58, 59, 122; 709/224, 229, 223, 239; 714/39, 41, 43

[56] References Cited

U.S. PATENT DOCUMENTS

| | | |
|---|---|---|
| 4,270,214 | 5/1981 | Davis et al. . |
| 4,965,795 | 10/1990 | Coffelt et al. .............. 370/110 |
| 5,182,554 | 1/1993 | Kaiser et al. .............. 340/826 |
| 5,226,120 | 7/1993 | Brown et al. . |
| 5,239,535 | 8/1993 | Borm et al. . |
| 5,274,631 | 12/1993 | Bhardwaj .............. 370/60 |
| 5,287,506 | 2/1994 | Whiteside .............. 395/650 |
| 5,432,907 | 7/1995 | Picazo, Jr. et al. .............. 395/200 |
| 5,489,896 | 2/1996 | Sofer et al. .............. 340/825.05 |
| 5,537,098 | 7/1996 | Patrick et al. .............. 370/452 |
| 5,563,930 | 10/1996 | Pester, III . |
| 5,574,722 | 11/1996 | Slykhouse et al. .............. 370/56 |
| 5,610,905 | 3/1997 | Murthy et al. .............. 370/401 |
| 5,644,617 | 7/1997 | Schmidt . |
| 5,680,397 | 10/1997 | Christensen et al. .............. 370/421 |
| 5,696,701 | 12/1997 | Burgess et al. . |
| 5,710,777 | 1/1998 | Gawne .............. 395/200.54 |
| 5,715,293 | 2/1998 | Mahoney .............. 379/23 |

*Primary Examiner*—Mark H. Rinehart
*Attorney, Agent, or Firm*—Blakely, Sokoloff, Taylor & Zafman LLP

[57] ABSTRACT

A method and apparatus for monitoring the performance of a dedicated communications medium in a switched data networking environment wherein a probe having a bypass circuit allows promiscuous monitoring of all traffic between a switch and a network device, such as a file server, in either direction, and in full duplex mode. Additionally, the bypass circuit eliminates the requirement for a separate repeater between the switch and the network device.

29 Claims, 4 Drawing Sheets

METHOD AND APPARATUS FOR MONITORING A DEDICATED COMMUNICATIONS MEDIUM IN A SWITCHED DATA NETWORK

This nonprovisional patent application claims the benefit of U.S. Provisional Application No. 06/012,038, filed Feb. 23, 1996.

This application is related to U.S. application Ser. No. 08/722,609, filed Sep. 27, 1996, entitled 'Method and Apparatus for Monitoring a Dedication Communications Medium in a Switched Data Network.'

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of computer networking. Specifically, the present invention is related to a method and apparatus for monitoring the performance of a dedicated communications medium in a switched data networking environment.

2. Background of the Invention

With reference to FIG. 1, prior art data networks generally utilized one or more shared media hubs, e.g., hub 100. Multiple end user workstations, e.g., workstations 1, 2 and 3, were coupled to a shared communications medium (mediums 10, 20 and 30, respectively) that was, in turn, coupled to a port on the shared media hub. The hub 100 had multiple ports (e.g., ports 11, 21, 31), each coupled to a different shared communications medium. High end workstations, or servers, such as file servers or print servers, were also coupled via a dedicated or shared communications medium to a port on the shared media hub.

As the applications running on these data networks became more mission critical, and bandwidth utilization of the shared communications media increased, it became advantageous to monitor the performance and the error rates of data traffic on the shared communications media to facilitate proper operation of the data network. To accomplish this monitoring, network monitoring devices were configured into shared media hubs, or coupled to the port (41) of a shared media hub via a communications medium (40) as stand-alone devices (e.g., probe 4). In either configuration, the monitoring devices were typically referred to as probes. The probes would promiscuously monitor the data traffic on all shared communications media in the network and look at, for example, performance and error statistics, data traffic patterns and typical data flows across the shared communications media.

As shown in FIG. 2, as performance requirements of prior art data networks continued to increase, and additional performance intensive applications were employed, the shared communications media coupled to the shared media hubs were typically divided into multiple network segments (e.g., network segments 201, 202 and 203) to reduce data traffic on each segment, although all network segments were still in the same collision domain, i.e., the network segments were not electrically isolated. Data communication between these segments generally utilized well known backbone, rather than switching, technology.

As performance requirements continued to increase to meet traffic demands, switches such as switch 220 illustrated in FIG. 2 were used to segment the network into multiple collision domains. Segmenting the network into multiple collision domains so that a data packet from one segment (e.g., segment 201) did not traverse the network to another segment (e.g., segment 202) unless the data packet was destined to a particular device on another segment as determined by, for example, a destination address specified in the data packet.

The problem, however, in monitoring network performance in this environment utilizing probes was that a single probe was required for each segment in order to promiscuously monitor the data traffic on that segment. With reference to FIG. 3, as the data networks became highly segmented, it became evident that it was impractical to attach a probe to each segment in the network to promiscuously monitor all traffic. Rather, network administrators tended to concentrate probing activities to highly concentrated server farms or segments in the network where the traffic was the busiest, for example, a segment from a switch to a file server. These file servers were typically coupled via a dedicated communications medium to a port on a switch to provide, for example, a data communications rate of 10 megabits or 100 megabits per second to the file server. Connecting the file server using a dedicated communications medium to the switch 220 formed a single station network segment. In a single station network segment, it was impossible to attach a probe to that segment to promiscuously monitor all network traffic because only a single port was necessarily available to which the segment is coupled to the switch. To overcome this limitation, a multiport repeater was inserted between the switch and the file server, e.g., repeater 233 between workstation 3 and switch 220 in FIG. 3, thereby providing additional ports (on the inserted multiport repeater) to facilitate connection of a probe (e.g., probe 235) into the segment.

Although switch 220 in FIG. 3 shows only six ports for purposes of illustration, it is understood that a switch may have sufficient ports to support, for example, ten or twenty servers. In such a situation, it becomes impractical to attach a repeater between every server and switch port to promiscuously monitor data traffic, due to the increased cost, space, and asset management responsibilities encountered as a result of the additional equipment. In addition, for each communications medium that was to be monitored, that network segment would have to be taken down, the server disconnected from the switch, the repeater inserted into the communications medium, and the server communication reestablished. This process would be highly disrupting to data communications in the network. Moreover, in attempting to diagnose a performance problem, one would be required to shut down the network segment, insert a repeater, and couple a probe to the repeater in order to collect monitoring data. By the time the probe was operable, the performance problem may well have disappeared.

SUMMARY OF THE INVENTION

A method and apparatus for monitoring performance in a switched network environment is disclosed. An embodiment of the present invention is coupled between a switch and a network device, for example, a file server, to provide a promiscuous tap into the communications medium between the switch and the network device. The apparatus promiscuously monitors all packets between the switch and the network device without the need for a repeater, yielding significant economic savings and eliminating the downtime as may occur in the prior art when performing troubleshooting operations.

A bypass circuit embodied in the probe allows promiscuous monitoring of all traffic between the switch and the network device in either direction, and in full duplex mode. Additionally, the bypass circuit eliminates the requirement for a separate repeater between the switch and the network device. Moreover, the bypass circuit is fault tolerant, i.e., if power is disrupted to the probe or if the probe malfunctions, the bypass circuit allows traffic to continue to pass between the switch and the network device—data traffic is not disrupted in any manner as a result of failure or malfunction of the monitoring aspect of the probe.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENTS OF THE INVENTION

The present invention is a method and apparatus for monitoring the performance of a dedicated communications medium in a switched data networking environment. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
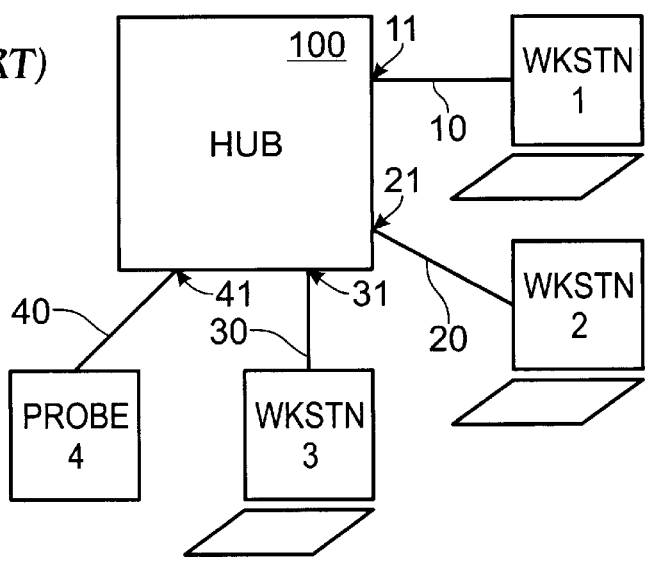
FIG. 1 is an illustration of a data network utilizing a shared communications media hub.
Figure 2:
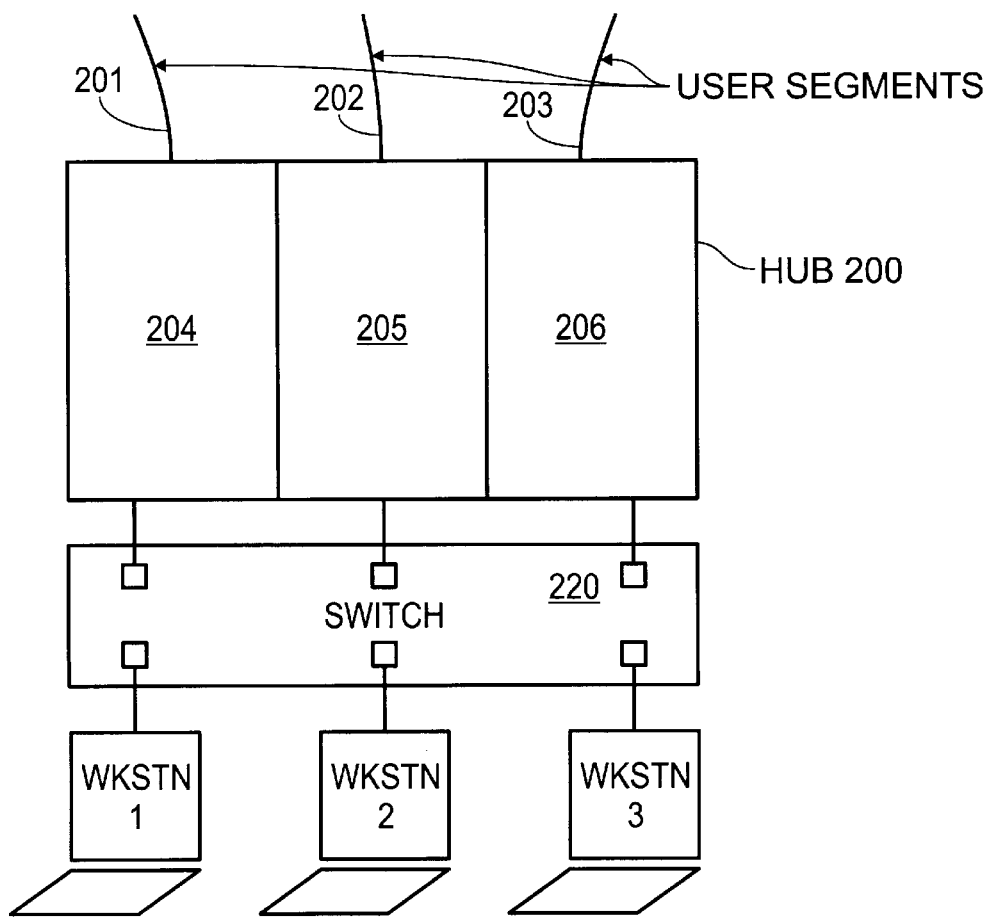
FIG. 2 is an illustration of a data network utilizing a switching hub (switch) to provide a dedicated communications medium to a network device.
Figure 3:
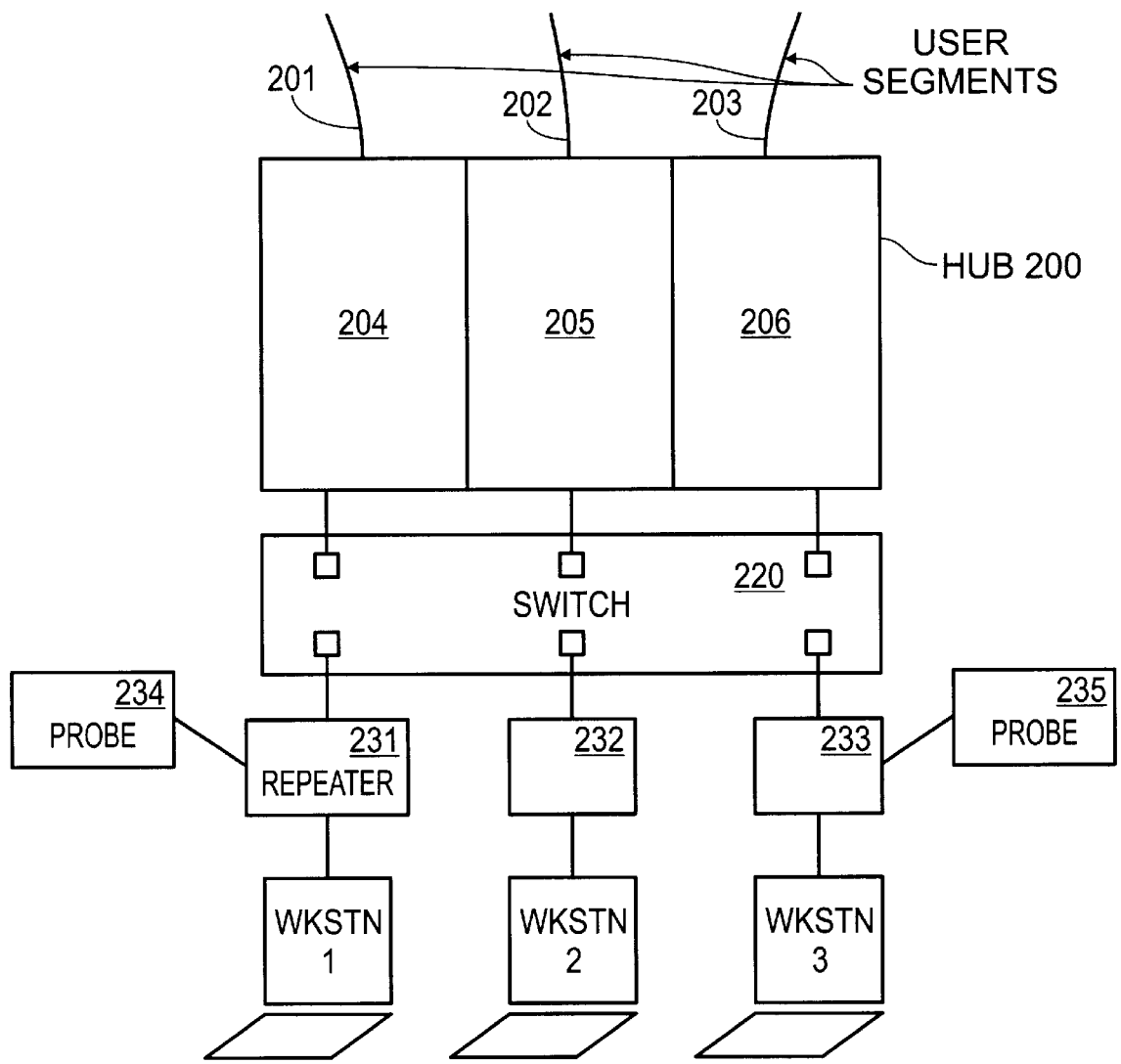
FIG. 3 is an illustration of a prior art method of monitoring performance in a data network utilizing a repeater coupled to each network device.
Figure 4:
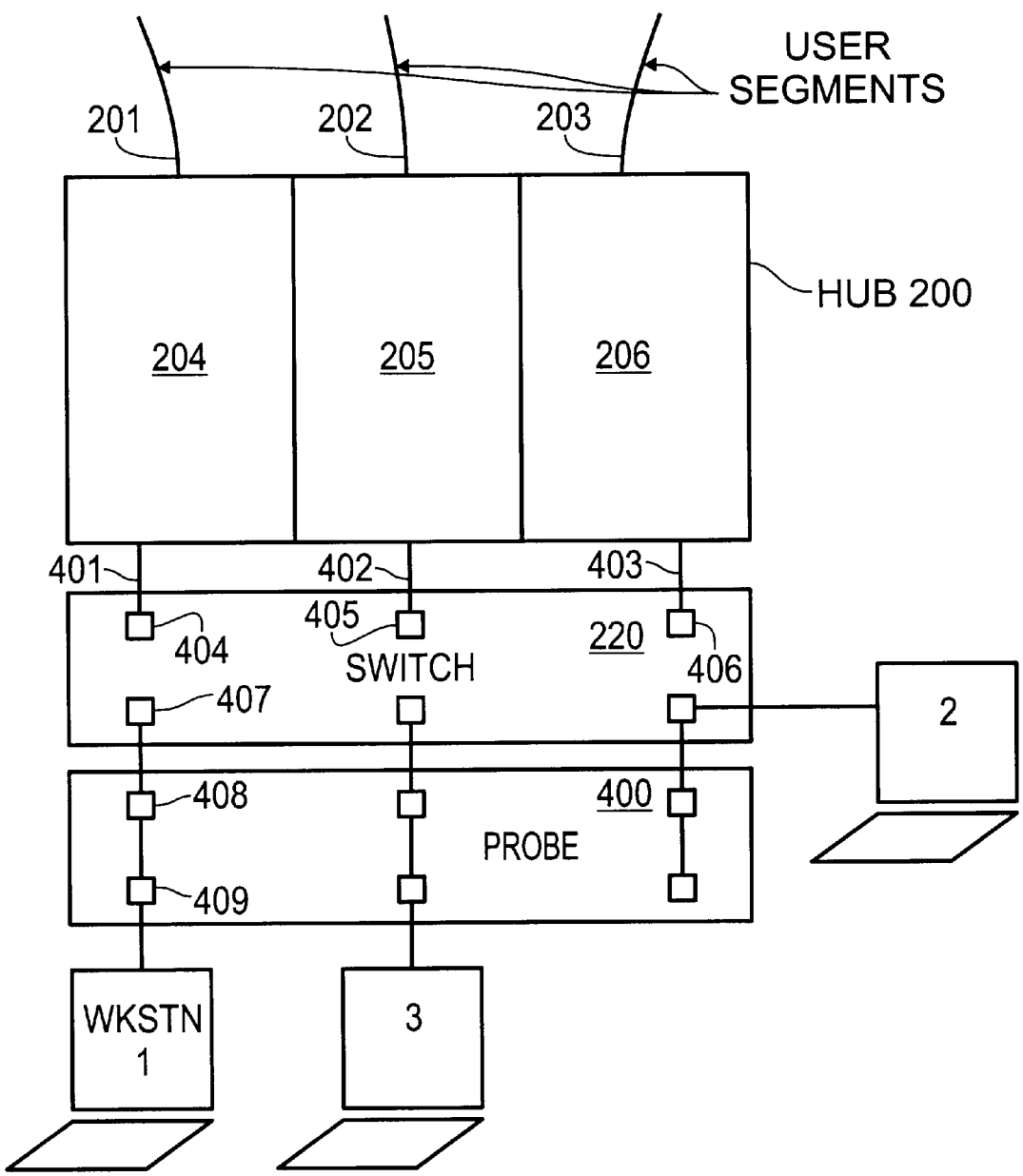
FIG. 4 is an illustration of an embodiment of the present invention.

With reference to FIG. 4, an embodiment of the present invention as may be utilized in a typical switched data networking environment is illustrated. Multiple network segments 201, 202 and 203 are coupled to a shared media hub 200. Each segment is connected to separate modules 204, 205 and 206, respectively, within the hub. Each of the hub modules are coupled via a dedicated communications medium 401, 402 and 403 to an individual port 404, 405 and 406 on a switch 220. Ports on the switch are additionally shown connected either to a dedicated network device, e.g., device 2 (perhaps an end user workstation or a server), or connected to an embodiment of the present invention, i.e., a probe 400. More specifically, a port (e.g., port 407) on the switch may be connected to a port (e.g., port 408) on the probe. Another port (409) on the probe, in turn, is coupled to a network device such as device 1. Probe 400 includes circuitry for repeating data packets between the switch and the network devices coupled to the probe.

The probe 400 utilizes internal bypass circuitry in promiscuously monitoring the communications medium coupling network devices 1 and 3 to the probe. The probe promiscuously monitors all traffic between the hub 200 and switch 220 destined for or received from either network device 1 or network device 3. All data traffic is captured and subsequently saved, e.g., for some form of analysis or statistical compilation. The probe analyzes those packets according to, for example, the remote monitoring standards RMON I or II. These standards promulgate, for example, specific statistical characteristics, such as user history, performance and error rates and traffic patterns between different workstations on the network across all layers of the International Standards Organization (ISO) Open Systems Interconnection (OSI) seven layer networking model.

An embodiment of the bypass circuit as may be utilized in the probe 400 of FIG. 4 is now described with reference to FIG. 5. A probe 400 is shown (in dotted lines) coupled between a switch 220 and a network device 1 (i.e., data terminating equipment—DTE) via a transmit/receive pair of lines, e.g., conventional unshielded twisted pair wiring operating in full duplex. The transmit/receive pair is coupled from the probe to the switch at port 407 and the DTE at port 408 by way of, for example, standard RJ45 connectors. The output of the switch is transmitted out the transmit port (TX) 407*b* over the transmit line and passes through a relay 412 in the probe to the receive port (RX) 408*b* of the DTE (network device). The other line in the full duplex link is coupled between the transmit port (TX) 408*a* of the DTE and the receive port (RX) 407*a* of the switching hub 220. This line passes through relay 414 in the probe. Within the probe, relay 412 is connected to repeater 416, while relay 414 is connected to repeater 418. Each of repeaters 416 and 418 are further coupled to a monitoring device 410 that monitors the individual lines of the twisted pair.

Figure 5:
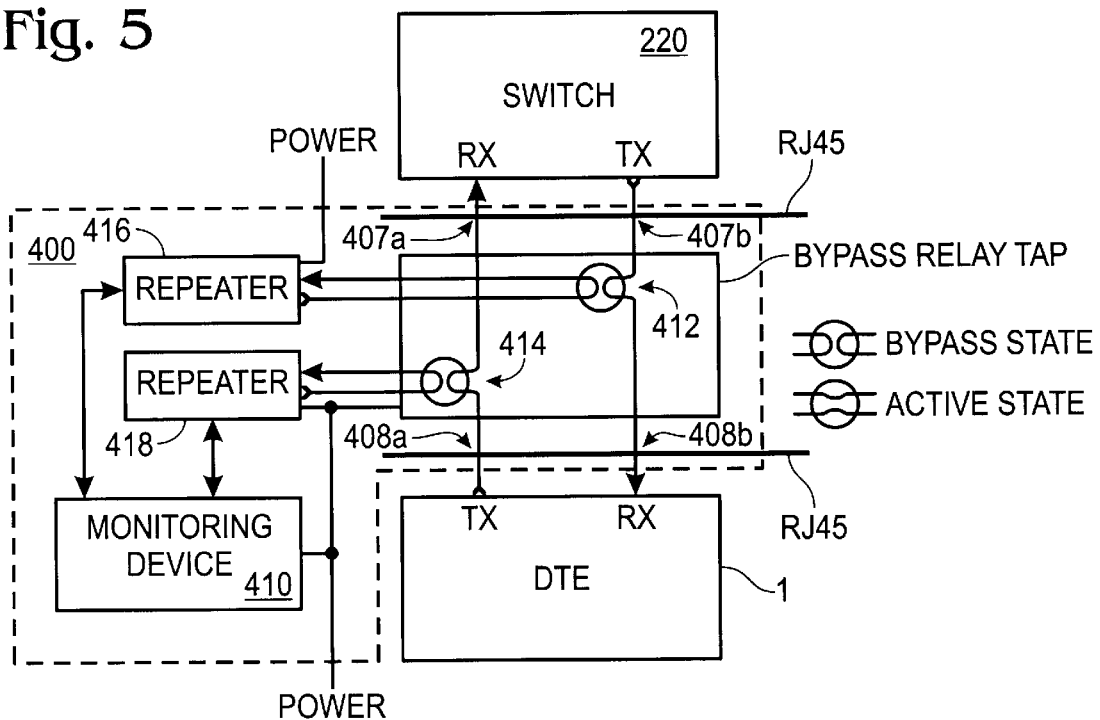
FIG. 5 illustrates an embodiment of the bypass circuit as may be utilized by the probe of FIG. 4.

In the embodiment illustrated in FIG. 5, relays 412 and 414 can both be enabled (in the active state) so that data packets passing through the relays are transmitted to the monitoring device 410 via repeaters 416 and 418, respectively, as the data packets are transmitted between the DTE and the switching hub. The probe is in monitor mode when the relays are active. If, for example, power fails, the relays are in the bypass position (as indicated in the illustration), thus allowing transfer of the data frames to continue between the switching hub and network device (DTE) in the event of loss of power to the probe. In this situation the relays are inactive and the probe is in bypass mode. Thus, only when the relays are active do data packets on both lines of the twisted pair pass through the repeaters to be repeated to the monitoring equipment before continuing through the probe coupled between the switching hub and DTE. It is envisioned that this embodiment could be coupled to multiple ports by using different relay arrangements to provide for full duplex operations.

A second embodiment of the bypass circuit as may be utilized in the probe 400 of FIG. 4 is now described with reference to FIG. 6. A probe 400 is shown (in dotted lines) coupled between a switch 220 and a network device 1 (i.e., data terminating equipment—DTE) via a transmit/receive pair of lines, e.g., conventional unshielded twisted pair wiring operating in full duplex. The transmit/receive pair is coupled from the probe to the switch at port 407 and the DTE at port 408 by way of, for example, standard RJ45 connectors. The output of the switch is transmitted out the transmit port (TX) 407a over the transmit line and passes through a high impedance passive tap 422 in the probe to the receive port (RX) 408a of the DTE (network device). The other line in the full duplex link is coupled between the transmit port (TX) 408b of the DTE and the receive port (RX) 407b of the switching hub 220. This line passes through a high impedance passive tap 424 in the probe. Within the probe, tap 424 is connected to amplifier 428, while tap 422 is connected to amplifier 426. Each of amplifiers 426 and 428 are further coupled to a monitoring device 410 that monitors the individual lines of the twisted pair.

Figure 6:
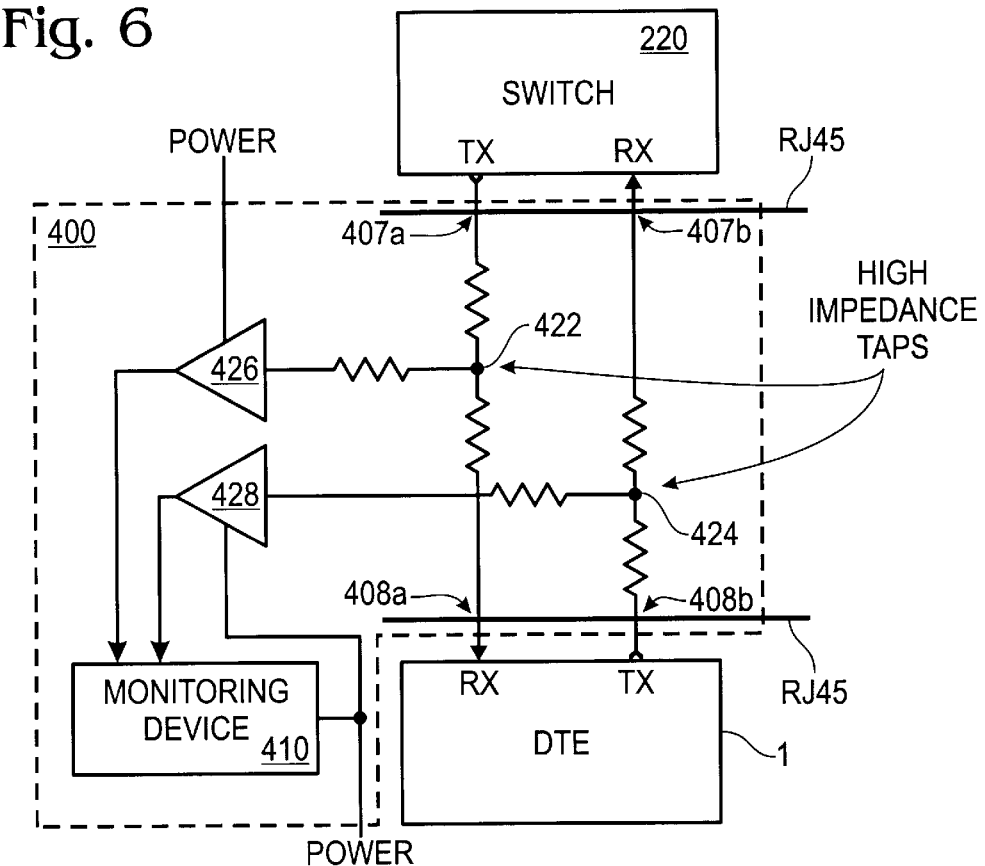
FIG. 6 illustrates another embodiment of the bypass circuit as may be utilized by the probe of FIG. 4.

In the embodiment illustrated in FIG. 6, taps 422 and 424 are configured so that data packets passing through the taps can be transmitted to the monitoring device 410 via amplifiers 426 and 428, respectively, as the data packets are transmitted between the DTE and the switching hub. The probe is in monitor mode when the power is present at the amplifiers. If, for example, power fails, the amplifiers fail to provide sufficient signal strength to the monitor such that the taps/amplifiers are in the bypass position. The taps, however, do not prevent the transfer of the data frames to continue between the switching hub and network device (DTE) in the event of loss of power to the probe. Thus, only when the amplifiers are active do data packets on both lines of the twisted pair pass through the taps and amplifiers to the monitoring equipment as the packets are passing through the probe coupled between the switching hub and DTE.

Taps 422 and 424 are very high impedance taps that load the line very lightly so as not to affect the normal operation of the line. Amplifiers 426 and 428 increase the level of the signal amplitude lost due to the passive taps to levels appropriate for the monitoring device. In this way, if the amplifiers are powered down or power to the probe is lost, there will be no effect to the transmission path between the switching hub and the network device (DTE), i.e., the probe will continue to forward data directly through the probe in bypass mode, rather than forward data through the monitor as when in monitor mode.

An advantage to the high impedance taps is that a repeater is not required in each line. This embodiment, therefore, can be more easily scaled to larger data networking architectures. Another advantage is the passive tap is more reliable than an electromechanical relay.

It is also well understood by those of ordinary skill in the art that the embodiment illustrated in FIG. 6 could be modified to include a multiplexor on the active amplifiers so that it could work in a full duplex environment.

It should be note that there are, of course, many possible alternatives to the described embodiments which are within the understanding of one of ordinary skill in the relevant art.

What is claimed is:

1. A probe comprising:
   a first port to communicatively couple with a first communications medium;
   a second port to communicatively couple with a second communications medium;
   a monitor to monitor communications passed from the first port to the second port; and
   a bypass circuit to forward the communications from the first port to the second port, bypassing the monitor, when power to the probe is interrupted.

2. The probe of claim 1, wherein the monitor is to receive the communications from the first port when the probe is in a monitor mode.

3. The probe of claim 1, wherein the monitor is not to receive the communications from the first port when the probe is in a bypass mode.

4. The probe of claim 1 wherein the bypass circuit comprises:
   a passive tap to communicatively couple with the first port and the second port; and
   an amplifier to communicatively couple with the passive tap and the monitor, said amplifier to pass the communications from the first port to the monitor when power is applied to the amplifier.

5. A probe comprising:
   a first port to communicatively couple with a first network device;
   a second port to communicatively couple with a second network device;
   a bypass circuit to couple the first port to the second port to forward communications received from the first network device via the first port to the second network device via the second port whether or not power is applied to the probe; and
   a monitor to couple with the bypass circuit, the monitor to receive and monitor the communications forwarded from the first port to the second port when power is applied to the probe.

6. The probe of claim 5 wherein the bypass circuit is in a bypass mode when power is not applied to the probe, and the bypass circuit is in a monitor mode when power is applied to the probe.

7. The probe of claim 5 wherein the bypass circuit comprises:
   a high impedance tap to couple with the first port and the second port; and
   an amplifier having an input to couple with the high impedance tap and an output to couple with the monitor to receive the communications from the first port via the high impedance tap and forward the communications to the monitor.

8. A probe comprising:
   a plurality of ports including a first port and a second port;
   a monitoring device to monitor a transfer of data from the first port to the second port; and
   a bypass circuit having at least two modes of operation, the bypass circuit to forward the data transferred from the first port to the second port and bypass the monitoring device when the bypass circuit is placed in a first mode of operation.

9. The probe of claim 8, wherein the bypass circuit includes a relay placed in an inactive state when the bypass circuit is placed in the first mode of operation, the relay in the inactive state to route the data from the first port to the second port and bypass the monitoring device.

10. The probe of claim 9, wherein the relay is in the inactive state when a supply of power to the probe is discontinued.

11. The probe of claim 9, wherein the bypass circuit further includes a repeater coupled to the relay and the monitoring device.

12. The probe of claim 11, wherein the relay of the bypass circuit routes the data from the first port to the monitoring device via the repeater when the relay is placed in an active state so that the bypass circuit is in a second mode of operation.

13. The probe of claim 8, wherein the bypass circuit includes
   a line communicatively coupled to the first port to the second port, the line includes a passive tap;
   an amplifier coupled between the passive tap and the monitoring device.

14. The probe of claim 13, wherein the line routes the data from the first port to the second port, bypassing the monitoring device when the amplifier is placed in an inactive state.

15. The probe of claim 14, wherein the amplifier is placed in the inactive state when a supply of power to the amplifier is discontinued.

16. The probe in claim 13, wherein the line routes the data from the first port to the monitoring device when the amplifier is placed in an active state, thereby placing the bypass circuit in a second mode of operation.

17. The probe of claim 8, wherein the data is in a packet format.

18. A network comprising:
   a hub including a plurality of modules to handle data traffic from multiple network segments;
   a switch including a plurality of ports, each port in communication with one of the plurality of modules;
   a network device in communication with one of the plurality of ports; and
   a probe coupled to the plurality of ports and the network device, the probe includes (i) a monitoring device and (ii) a bypass circuit to transfer data from a first port of the switch to the network device and to bypass the monitoring device when the probe is placed in a first mode of operation.

19. The network of claim 18, wherein the probe is placed in the first mode of operation by discontinuing a supply of power to the probe.

20. The network of claim 19, wherein the bypass circuit of the probe includes a relay to route the data from the first port of the switch to the network device and to bypass the monitoring device when a supply of power to the probe is discontinued.

21. The network of claim 18, wherein the bypass circuit further includes
   a line communicatively coupling the first port and the second port, the line includes a passive tap; and
   an amplifier coupled between the passive tap and the monitoring device, the amplifier is placed in an inactive state when the bypass circuit is placed in the first mode of operation in order to bypass the monitoring device.

22. The network of claim 18, wherein the network device is a digital terminal equipment.

23. A method comprising:
   receiving data by the probe disposed between a switch and at least one network device;
   placing the probe is in a first mode of operation; and
   bypassing a monitoring device of the probe by providing the data directly to the at least one network device when the probe is in the first mode of operation.

24. The method of claim 23, wherein prior to receiving data by the probe, the method further comprises coupling a relay between a first port of the probe coupled to the switch, a second port of the probe coupled to the network device and the monitoring device.

25. The method of claim 24, wherein the placing of the probe in the first mode of operation includes
   placing the relay into an active state so that the first port is solely in communications with the second port.

26. The method of claim 25, wherein the placing of the relay in the inactive state includes discontinuing power to the probe.

27. The method of claim 23, wherein prior to receiving data by the probe, the method further comprises coupling an amplifier to a passive tap set along a transmit line coupling the first port and the second port.

28. The method of claim 27, wherein the placing of the probe in the first mode of operation includes placing the amplifier into an inactive state so that the first port is solely in communication with the second port.

29. A probe comprising:
   first means for receiving data;
   second means for receiving data;
   monitor means for monitoring a transfer of data from the first means and the second means; and
   means for forwarding the data transferred from the first means to the second means and for bypassing the monitor means when the means for forwarding is placed in a first of at least two modes of operation.

* * * * *